Dec. 9, 1969      B. D. BEDFORD      3,483,462
INVERTERS OPERABLE WITH A WIDE RANGE OF LOAD IMPEDANCES
Filed Sept. 29, 1967      4 Sheets-Sheet 1

Inventor:
Burnice D. Bedford,
by Donald R. Campbell
His Attorney.

Inventor:
Burnice D. Bedford,
by Donald R. Campbell
His Attorney.

Dec. 9, 1969  B. D. BEDFORD  3,483,462
INVERTERS OPERABLE WITH A WIDE RANGE OF LOAD IMPEDANCES
Filed Sept. 29, 1967  4 Sheets-Sheet 3

Inventor:
Burnice D. Bedford,
by Donald R. Campbell
His Attorney.

Inventor:
Burnice D. Bedford,
by Donald R. Campbell
His Attorney.

United States Patent Office 3,483,462
Patented Dec. 9, 1969

3,483,462
INVERTERS OPERABLE WITH A WIDE RANGE OF LOAD IMPEDANCES
Burnice D. Bedford, Scotia, N.Y., assignor to General Electric Company, a corporation of New York
Filed Sept. 29, 1967, Ser. No. 671,760
Int. Cl. H02m 7/44, 7/68
U.S. Cl. 321—45       12 Claims

ABSTRACT OF THE DISCLOSURE

A family of static inverters for zero to infinity load comprise a pair of alternately conducting thyristors each connected in series with an inductor and a commutating capacitor and coupled together across a pair of D-C supply terminals. The output load circuit is connected between a point on these coupled series circuits and a pair of blocking diodes each having one terminal connected directly to a supply terminal such that load current does not flow until a commutating capacitor has charged to at least the supply voltage. For high impedance loads, means are provided to limit the circuit voltages. In compromise circuits, a capacitor coupled to the diode end of the output load circuit permits passage of some load current immediately although the principal load current does not flow until the capacitor is charged to commutate the circuit. The output wave shape can be improved in other ways.

---

This invention relates to inverters, and more particularly to static inverters which are operative over a wide range of load impedance. These inverters use thyristors as the power devices, and in the basic circuits the load impedance may vary from zero to infinity, while similar compromise circuits are presented wherein the wave shape and regulation are improved but which are capable of handling a more limited variation in load impedance or frequency.

It can be stated in general that most inverters using non-gate turn-off thyristors as the switching devices are designed to be operative with a relatively narrow range of load impedances. The reasons for this can be seen by examining two of the basic classifications of these inverter circuits, namely, the series capacitor commutated inverter and the parallel capacitor commutated inverter. The series capacitor commutated inverter generally involves a series L-C resonant circuit to provide commutation wherein the load is connected in series circuit relationship with a commutating inductor, the commutating capacitor, and the power thyristor. The resonant frequency of the circuit determines the duration of the damped sinusoidal pulse of current through the thyristor in series with the resonant circuit and the load, and as the capacitor voltage builds up the current through the thyristor drops to below the holding current so that it is rendered nonconductive. In this circuit the current through the load is the same as the current in the commutating capacitor, and thus for a high impedance load the voltage on the commutating capacitor is too small to provide a sufficient commutating voltage, while with a low impedance load there is too much commutating voltage. In the parallel capacitor commutated inverter, the circuit is commutated by a capacitor connected in parallel circuit relationship with the load, and the thyristor is connected in series with this parallel-connected circuit. The capacitor is charged as the thyristor conducts, and to achieve commutation the capacitor is connected across the thyristor to apply a reverse biasing voltage to the thyristor, thereby diverting current to the capacitor so that the hyristor turns off. Since the commutating capacitor is connected in parallel with the load and the load voltage is the same as the voltage on the capacitor, with a high impedance load there is too much commutating voltage whereas with a low impedance load there is too little commutating voltage. At the two extremes of load impedances, zero and infinity, the series capacitor commutated inverter and the parallel capacitor commutated inverter act the reverse, and inverters of these types or of hybrid types where commutation is accomplished by a combination of series and parallel capacitor commutation techniques ordinarily are operative over narrow ranges of load impedance.

Accordingly, an object of the invention is to provide a new and improved family of inverter circuits which are operable with very large changes in load impedance extending from zero to infinity.

Another object is the provision of new and improved inverter circuits having a configuration similar to the foregoing circuits but which supply an improved waveform at the expense of being usable with a more restricted range of load imperances, although the range of load impedances is still relatively wide.

Yet another object is to provide new and improved inverter circuits using nongate turn-off thyristors wherein commutation is obtained reliably and with economy for a large variation in load impedances.

In accordance with the invention, a new and improved family of inverter circuits comprises a pair of series connected circuits each comprising the combination of a thyristor device, a commutating inductor means, and commutating capacitor means all effectively coupled in series circuit relationship. The pair of series connected circuits are connected across a pair of power supply terminals and coupled together such that the commutating capacitor means of at least one of these series connected circuits is charged when one of the thyristor devices is conducting and is discharged through at least a portion of the commutating inductor means to assure commutation of this same thyristor device when the other thyristor device is rendered conductive by gating means for the thyristors. Output load circuit means is connected to at least one point on the coupled series connected circuits at which the potential changes as the voltage on the charging commutating capacitor means changes. Solid state switching means are connected to another portion of the output load circuit means for blocking the principal path for flow of load current until the charging commutating capacitor means has charged to a predetermined potential related to the supply voltage and renders conductive at least a portion of the solid state switching means to permit the passage of load current through the output load circuit means to a load. Thus reliable commutation of the thyristors is obtained over a wide range of load impedances.

In the preferred embodiments, the thyristors are gate controlled thyristors such as silicon controlled rectifiers, and the solid state switching means comprises a pair of similarly poled diodes which become conductive when the commutating capacitor means charges to the full value of the supply voltage. In other embodiments, voltage limiting means are provided for high load impedance conditions, and in a group of compromise circuits, at least one additional capacitor is connected to the other end of the output load circuits means to provide a path for load current before the diodes become conductive, to thereby improve the output wave shape. Other circuit variations achieve improvement of the output wave shape in different ways.

The foregoing and other objects, features, and advantages of the invention will be apparent from the following more particular description of several preferred embodiments of the invention, as illustrated in the accompanying drawings wherein:

FIGS. 9 and 10 are schematic circuit diagrams of compromise inverter circuits based on the circuit of FIG. 7 which, like the FIG. 3 circuit, are operative with a more limited range of load impedances; FIG. 10 further has voltage limiting means.

Figure 1:
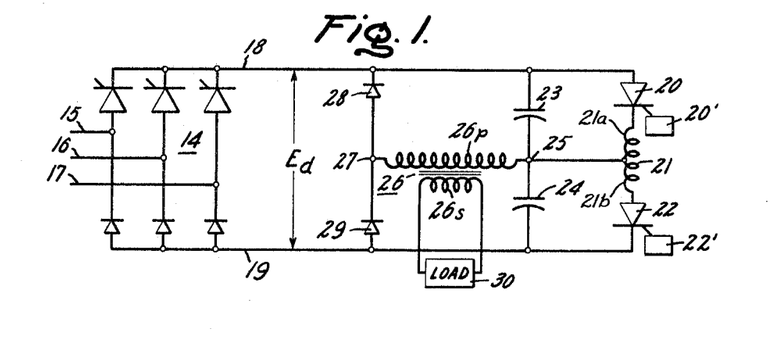
FIG. 1 is a schematic circuit diagram of a basic inverter circuit suitable for a wide range of load impedances including zero load.

The basic inverter circuit shown in FIG. 1 is supplied with controlled D-C power by means of a conventional three-phase bridge rectifier identified generally at 14 which is connected at its input side to the three lines 15, 16, and 17 of a three-phase power system. The bridge rectifier 14 is preferably a phase controlled rectifier and for this reason comprises three silicon controlled rectifiers connected to the output positive D-C supply terminal 18, as well as three diodes each connected to the negative D-C supply terminal 19. The average voltage $E_d$ appearing between the output D-C supply terminals 18 and 19 has low ripple and can be controlled in the well-known manner by control of the conduction of the silicon controlled rectifiers. Across the D-C supply terminals 18 and 19 provided in this manner is connected in series circuit relationship a first power silicon controlled rectifier 20, a commutating inductor 21, and a second power silicon controlled rectifier 22. The silicon controlled rectifier is also known as a gate controlled thyristor and is a well-known semiconductor switching device which can be rendered conductive when its anode voltage is positive with respect to its cathode upon the application of a gating signal to its gate electrode, but thereafter the gate electrode loses control over conduction through the device and to turn it off or commutate it off it is necessary to reduce the current through the device to a value below the holding current or to reduce the anode potential relative to the cathode potential. Connected in parallel circuit relationship across the direct current power supply with the series circuit comprised by the commutating inductor 21 and the two SCR's 20 and 22 are a pair of series connected commutating capacitors 23 and 24 whose junction point 25 is connected to the center tap point of the inductor 21, thereby providing two equal inductor winding halves 21a and 21b. To complete the inverter circuit, an output transformer 26 is connected between the junction point 25 of the two commutating capacitors 23 and 24 and another junction point 27 between two similarly poled blocking diodes 28 and 29 which are connected in series circuit relationship across the D-C power supply terminals 18 and 19. The primary winding 26p of the output transformer 26 is connected between the junction points 25 and 27, while the secondary winding 26s is connected in series circuit relationship with the load 30. The output transformer 26 and the load 30 together comprise the output load circuit means, and if desired the load 30 in this circuit may be connected directly between the junction points 25 and 27. Suitable gating circuits 20' and 22' are provided to supply properly timed gating signals to the gate electrodes of the SCR's 20 and 22 to render thm conductive, however the gating circuits are not illustrated in detail since they are conventional. Various appropriate gating circuits are described for instance in the Silicon Controlled Rectifier Manual 4th edition, published by the General Electric Company, Rectifier Components Department, Auburn, N.Y., copyright 1967.

In operation of the inverter circuit of FIG. 1, let it be assumed that both of the SCR's 20 and 22 are non-conducting and that the first half cycle of operation is initiated by applying a gating signal to the gate electrode of the SCR 20 to render it conductive. Current flows through the SCR 20 and the inductor half 21a to the junction point 25 where it splits and begins to charge the commutating capacitor 24 toward the supply voltage $E_d$. At this instant no load current is supplied to the load 30 since the junction point 27 has a positive potential less than $E_d$ so that both of the blocking diodes 28 and 29 are reverse biased. Energy is stored in inductor half 21a due to the resonant charging of capacitor 24 and the discharge of capacitor 23, and reaches its maximum when capacitor 24 is charged to the full value of the supply voltage. However, when the commutating capacitor 24 is charged to the value of the supply voltage and the potential at the junction point 25 is also at least equal to $E_d$, the diode 28 is thereafter forward biased so that a circuit is completed through the primary transformer winding 26p and load current is supplied to the load 30 as the voltage at the junction point 25 builds up and then reduces in the nature of a sinusoidal pulse. More particularly, the energy stored in inductor half 21a is discharged into the capacitors 23 and 24 and into the load, in accordance with the ratio of their impedances, and current circulates in the closed loop including output transformer winding 26p, diode 28, SCR 20, and inductor half 21a.

To initiate the second half cycle of operation, the second SCR 22 is turned on thereby impressing the full value of the supply voltage $E_d$ across the other inductor half 21b. Due to autotransformer action, the voltage across the entire inductor 21 is now instantaneously equal to twice the supply voltage. The first SCR 20, which had been conducting, now is reverse biased and remains reverse biased for a sufficient period so that it is rendered non-conductive, the gating signal also having been removed. During this second half cycle of operation, the inverter circuit operates in mirror image fashion in that the other commutating capacitor 23 begins to charge such that when the junction point 25 reaches the potential of the negative D-C supply terminal 19, the diode 29 is thereafter forward biased so that load current passes through the output transformer 26 to the load 30. The energy stored in inductor half 21b (as capacitor 23 charges and capacitor 24 discharges) begins to discharge when point 25 reaches $E_d$, and load current circulates through the closed loop including output transformer winding 26p, diode 29, SCR 22, and inductor half 21b. To commutate off the SCR 22, the first SCR 20 is again turned on to connect the charged capacitor 23 across the inductor half 21a, thereby driving the potential on the anode of the SCR 22 to a value more negative than the supply voltage so that the SCR 22 is reverse biased and begins to turn off.

In this basic inverter circuit it is seen that reliable commutation is achieved over a wide range of load conditions because passage of load current to the load 30 in each half cycle of operation does not begin until the commutating capacitor 23 or 24 has been charged to the full value of the supply voltage. Under zero load or no-load conditions, which is equivalent to a short circuit between the junction points 25 and 27, the output wave shape is intermittent due to the fact that there is no load current until the diode 28 or 29 becomes forward biased, but reliable commutation is assured since there is always sufficient voltage on the commutating capacitor 23 or 24 to achieve commutation. When the load 30 is a higher impedance load, the peak commutating voltages are substantially higher so that commutation is assured, and this circuit furthermore has enough impedance to limit the current to a reasonable value. The circuit of FIG. 1 is capable of handling a wide load range if the D-C voltage is controlled to limit the output voltage and the capacitor voltage when the output load circuit has very high impedance. The phase controlled bridge rectifier 14 is often a convenient means of supplying controlled D-C power to the inverter. This circuit will also operate over a large frequency range.

Figure 2:
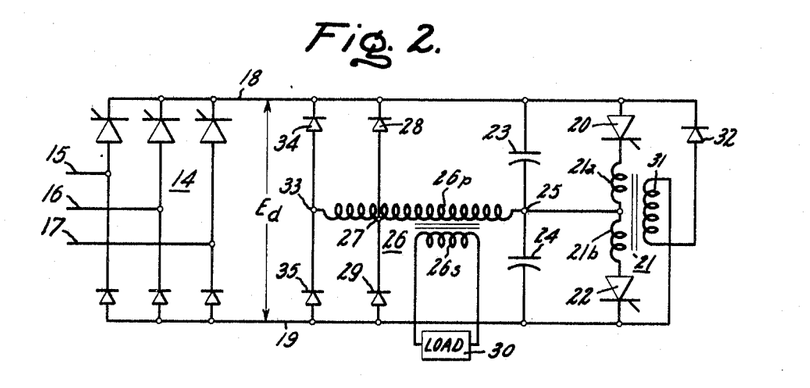
FIG. 2 is a modification of the circuit of FIG. 1 for limiting the voltages on the commutating components under high impedance load conditions.

The circuit illustrated in FIG. 2 is provided with voltage limiting means and may be preferred for a high impedance load. This inverter circuit is similar to FIG. 1 (corresponding parts are identified by the same reference numeral) but includes as one of several additional features an extra winding 31 on the inductor 21. This extra winding 31 is connected in opposite sense with respect to the commutating inductor windings 21a and 21b, and one end is coupled through the anode-to-cathode path of a blocking diode 32 to the positive D-C supply terminal 18 while the other end of the winding is connected to the negative D-C supply terminal 19. When the voltage across the extra reactor winding 31 exceeds the D-C supply voltage, the blocking diode 32 becomes conductive to return excess energy to the supply and result in limiting the voltage on the inductor 21, and therefore to also limit the excursions of the capacitor voltage at the junction point 25 as well as the output voltage in the output transformer 26. Another method of limiting the A-C voltage on the commutating capacitors 23 and 24 is to extend the primary winding 26p of the output transformer past the junction point 27 to the junction point 33 between another pair of diodes 34 and 35 which are poled in the same direction as the previously described diodes 28 and 29 and are connected respectively to the D-C supply terminals 18 and 19. These four diodes in conjunction with the portion of the output transformer winding 26p between the junction points 27 and 33 operate under high impedance load conditions in the manner of a single phase full wave bridge rectifier to return energy to the D-C circuit and limit the excursions of the voltage on the commutating capacitors at the junction point 25. When the first SCR 20 is conducting, the potential at the junction point 27 on the output transformer primary winding 26p becomes clamped to the potential of the positive D-C supply terminal 18 by the diode 28, while the potential at the junction point 33 swings more negative than the negative D-C supply terminal 19 so that diode 35 is conductive. During the half cycle when the second SCR 22 is conducting, the diodes 29 and 34 become forward biased to return excess energy to the D-C circuit. In addition to limiting the output voltage supplied to the load 30, the additional diodes 34 and 35 also carry current and improve the output voltage wave shape when supplying inductive load.

The use of the two voltage limiters shown in FIG. 2 is not necessary as either one is sufficient when the supply voltage is not controlled as was mentioned during the discussion of the operation of the FIG. 1 circuit. The output voltage under high impedance load conditions may alternatively be limited by replacing the linear output transformer 26 shown in FIG. 1 by a saturable transformer. Upon being driven into saturation, the primary winding of the saturable transformer assumes a low impedance and prevents the build-up of excessive currents and voltages. The inductor or reactor windings 21a and 21b may furthermore be loosely coupled to reduce the maximum voltage applied to the SCR's 20 and 22.

Figure 3:
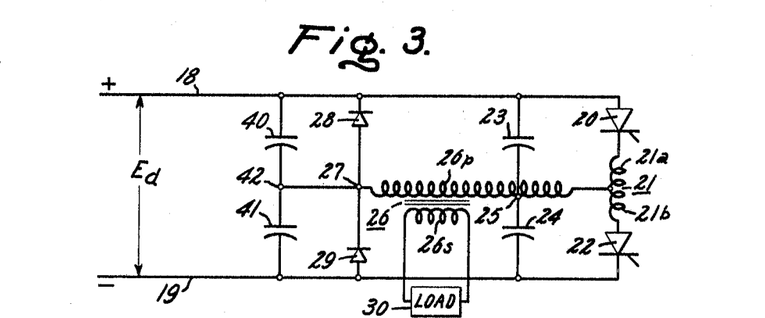
FIG. 3 is a schematic circuit diagram of a compromise inverter circuit having an improved output wave shape which is usable with a more restricted but still relatively wide range of load impedances.

FIG. 3 is a compromise circuit designed to improve the output wave shape at the expense of providing reliable commutation over a limited range of load impedance, although still a relatively wide range of load impedance. With this circuit, some load current is supplied to load 30 before the commutating capacitors 23 and 24, in their respective half cycles of operation, are charged to the full value of the supply voltage. However, this circuit is not reliably operative with a zero load, as is the FIG. 1 circuit, and cannot handle the infinity load reliably as does the FIG. 2 circuit or the modification of FIG. 1 using the saturable output transformer. In FIG. 3, two additional capacitors 40 and 41 are connected in series circuit relationship across the D-C supply terminals 18 and 19 in parallel with the blocking diodes 28 and 29, and the junction point 42 of the additional capacitors 40 and 41 is connected to the junction point 27 of these two diodes. With this arrangement, capacitors 40 and 41 supply a path for flow of load current through the primary winding 26p of the output transformer when the voltage on the oscillating commutating capacitors 23 and 24 is not enough to cause conducting of the diodes 28 and 29. During about the time the voltage at the junction point 25 of the two commutating capacitors is below the supply voltage, the diodes 28 and 29 are reverse biased but some current flows through the primary output transformer winding 26p to the additional capacitors 40 and 41. The principal portion of the load current does not flow, however, until one of the blocking diodes 28 or 29 is forward biased and becomes conductive.

The output wave shape is also improved by including a portion of the output transformer winding 26p between the junction point 25 of the commutating capacitors and the center tap point of the commutating inductor 21. The effect of this is to include some of the load resistance into the series charging circuit for the commutating capacitors 24 and 23. Thus, with the first SCR 20 conducting and the second SCR 22 turned off, the series resonant circuit which charges the commutating capacitor 24 through the inductor half 21a now includes some load resistance as determined by the portion of the output transformer primary winding 26p between the junction point 25 and the center tap on the inductor 21. In the same manner on the other half cycle of operation the series resonant circuit which charges the commutating capacitor 23 through the conducting SCR 22 and the inductor half 21b now includes some load resistance. The extra primary transformer winding in these circuits produces a circuit which can be characterized as a compromise between the novel circuits herein taught and a typical series capacitor commutated inverter in which the load itself or the output transformer is located entirely between the junction point of the commutating capacitors and the center tap point of the commutating inductor 21. The turns ratio of the portion of the output transformer primary winding 26p included between the junction point 25 and the center tap of the inductor 21, as compared to the portion included between the junction points 25 and 27, determines the degree of compromise between the circuits according to the invention and this known series capacitor commutated inverter circuit. The compromise circuit shown in FIG. 3 produces reliable commutation, good wave shape, and good regulation over a limited but still relatively wide range of load impedance.

Figure 4:
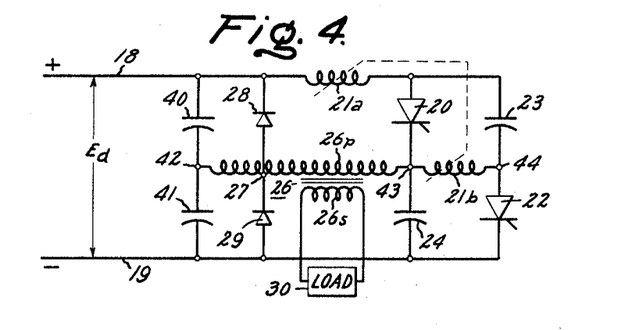
FIGS. 4 and 5 are similar to the compromise circuit of FIG. 3 but show different and more efficient arrangements of the commutating inductor.

FIG. 4 illustrates another compromise circuit in that it includes the additional capacitors 40 and 41 for implementing the flow of load current before the blocking diodes 28 and 29 become conductive. In this circuit there is an extra winding on the output transformer primary winding 26p which extends between the diode junction point 27 and the junction point 42 of the capacitors 40 and 41. Accordingly, the capacitors 40 and 41 are charged by current flowing through the entire primary winding 26p including the extra portion between the junction points 27 and 42, and the diodes 28 and 29 limit the positive and negative voltages impressed on these capacitors. The blocking diodes 28 and 29, as in the circuit of FIG. 3, at the same time permit ample excursion of the voltage impressed on the commutating capacitors 23 and 24. In this inverter circuit the two SCR's and commutating capacitors have a bridge-like arrangement in that the first SCR 20 is in series with the capacitor 24, and the commutating capacitor 23 is connected in series with the second SCR 22, these two respective series connected circuits being in turn in parallel circuit relationship with one another and connected across the D-C supply terminals 18 and 19. The two halves 21a and 21b of the commutating inductor are physically separated from one another although coupled magnetically. The inductor half 21a is connected in the positive D-C supply terminal 18 between the diode 28 and the first SCR 20, and the second inductor half 21b is connected between the junction point 43 of the SCR 20 and the commutating capacitor 24 and the junction point 44 of the other commutating capacitor 23 and the second SCR 22. The split inductor windings 21a and 21b have good utilization in that both function when either of the SCR's 20 and 22 conducts current. When the SCR 20 is turned on the commutating capacitor 24 is charged through the inductor 21a and because of the coupling between the inductors 21a and 21b, a voltage is induced in the winding 21b which aids the charging. Commutation of the SCR 20 is by the means of a hybrid combination of the series capacitor commutated inverter and parallel capacitor commutated inverter mechanisms which has been previously described. When the SCR 22 conducts current, charging of the commutating capacitor 23 also takes place through the inductive winding 21a, and the voltage induced in the other inductor winding 21b aids the charging.

Figure 5:
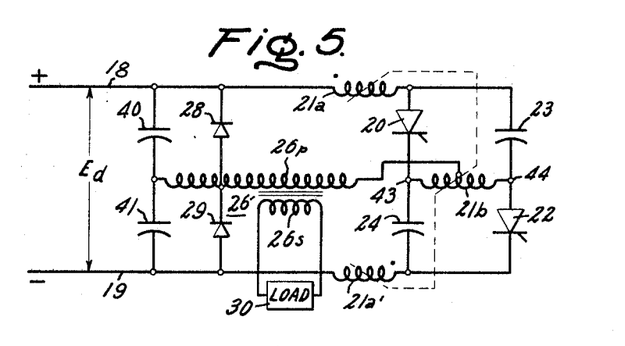

The circuit of FIG. 5 is identical to the FIG. 4 circuit with the exception that the commutating inductors are arranged symmetrically. Thus, there is an additional inductor winding 21a' in the negative D-C supply terminal 19 between the diode 29 and the commutating capacitor 24. The dots indicate the positive ends of the two inductor windings 21a and 21a'. The other inductor winding 21b is mid-tapped, and the mid-tap point is connected to the end of the output transformer primary winding 26p. The three inductor windings are coupled together, and there is some improvement in utility over the circuit of FIG. 4. During each half cycle of operation of the inverter when either the SCR 20 or the SCR 22 conducts current, both of the inductor windings 21a and 21a' are in the charging circuit for the commutating capacitor 24 or 23. It is believed that further details of the operation of the circuits of FIGS. 4 and 5 are similar to the previous circuits and need not be further discussed.

Figure 6:
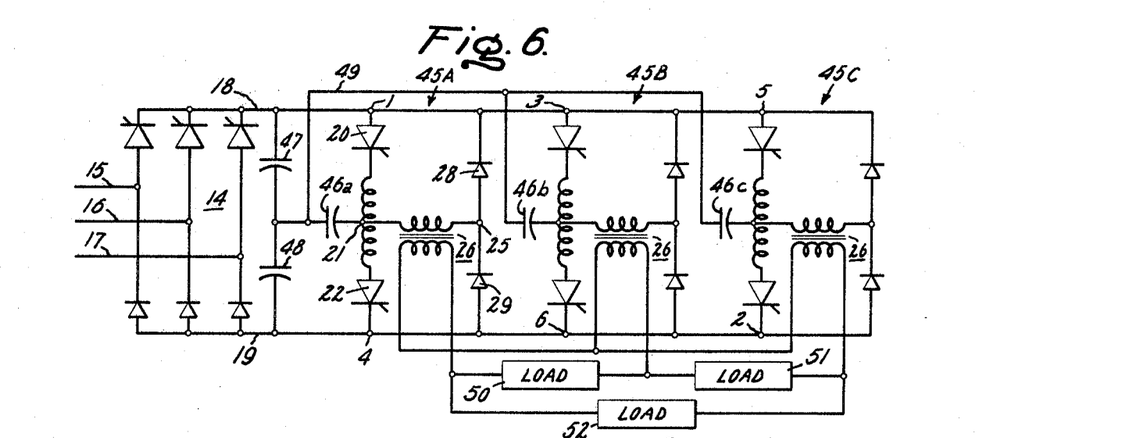
FIG. 6 is a schematic circuit diagram of a three-phase inverter circuit employing the basic single phase circuit of FIG. 1.

FIG. 6 is a diagram of a three-phase inverter circuit which receives its power from a phase controlled bridge rectifier 14 and has connected across the D-C supply terminals 18 and 19 three identical single phase inverters identified as 45A, 45B, and 45C. The three single phase inverters are functionally equivalent to the basic inverter circuit of FIG. 1, and corresponding elements in the inverter 45A have been given the same reference numerals. One change is that a single commutating capacitor 46a is connected to the center tap of the commutating inductor 21, and substitutes for the split capacitors 23 and 24 shown in FIG. 1. The other terminal of the commutating capacitor 46a is coupled to the mid-point of a pair of voltage dividing capacitors 47 and 48 connected in series circuit relationship across the D-C supply terminals 18 and 19. The mid-point of the series connected capacitors 47 and 48 is also connected through a D-C neutral line 49 to the corresponding commutating capacitors 46b and 46c in the respective single phase inverters 45B and 45C. The voltage dividing capacitors 47 and 48 may be eliminated for certain conditions of balanced polyphase load.

It is seen that the single commutating capacitor 46 in the inverter 45A charges one way when the SCR 20 is rendered conductive, and charges to the other polarity when the SCR 22 becomes conductive. The inverter 45A otherwise operates in the same manner as the basic inverter circuit in FIG. 1. The output of the three-phase inverter supplies power to a three-phase load comprising the loads 50, 51, and 52. The numbers 1–6 indicate the order of firing the SCR's. This polyphase inverter circuit has reliable commutation under zero load conditions as was the case with the FIG. 1 circuit, and continues to operate over a relatively wide load range if the D-C voltage is controlled to limit the output voltage and the capacitor voltage when the output circuit has high impedance.

Figure 7:
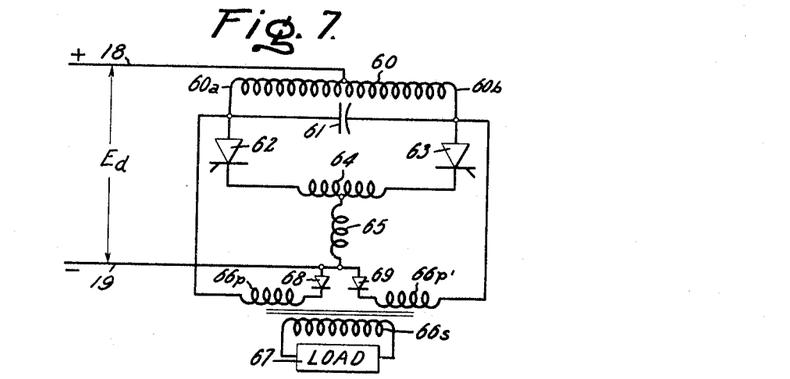
FIG. 7 is a schematic circuit diagram of a different embodiment of the invention including a mid-tapped transformer in parallel with the commutating capacitor for use with a low voltage source of supply, but which is functionally equivalent to the basic circuit of FIG. 1 and is operative with a wide range of load impedance including zero load.

FIG. 7 is a diagram of a different embodiment of the invention which is more suitable when the supply voltage is low, such as when using a battery as the power supply. Although the arrangement of the component elements in FIG. 7 is considerably different from what is shown in FIG. 1, the two inverter circuits are substantially functionally equivalent and have a similar mode of operation. The positive D-C supply terminal 18 in the circuit is connected to the center tap position of a mid-tapped transformer 60 across the ends of which is connected in parallel circuit relationship a commutating capacitor 61. One end 60a of the winding of transformer 60 is connected to the anode of a first SCR 62 and the other end 60b of the transformer is connected to the anode of a second SCR 63, and the cathodes of the two SCR's are coupled together through a first commutating inductor 64. The center tap point on the inductor 64 is coupled through a second commutating inductor 65 to the negative D-C supply terminal 19. The one end 60a of the transformer 60 is also coupled to the primary winding 66p of an output transformer which has a secondary winding 66s connected in series with the load 67. The other end of the output transformer primary 66p is coupled through a blocking diode 68 to the negative D-C supply terminal 19. The opposite end 60b of the transformer 60 is connected through a second output transformer primary winding 66p' and a blocking diode 69 to the supply terminal 19.

During a first half cycle of operation when the first SCR 62 is conductive and the second SCR 63 remains turned off, the commutating capacitor 61, which takes the place of the two commutating capacitors 23 and 24 in FIG. 1, begins to charge such that the plate adjacent the end 60a of the transformer 60 is negative while the plate adjacent the end 60b is positive. This arrangement effectively places the commutating capacitor 61 in series circuit relationship with the SCR 62 and half of the commutating inductor 64 and the complete commutating inductor 65. Because of the autotransformer action of the mid-tapped transformer 60, the final charge of the commutating capacitor 61 is twice the supply voltage $E_d$. A sinusoidal pulse of current flows in this oscillatory circuit, and when the commutating capacitor 61 has charged to a point where the negative potential at the end 60a of the transformer 60 begins to exceed the supply voltage, the diode 68 is rendered conductive and load current circulates through the output transformer windings 66p and 66s to the load 67. Similar to the case of the FIG. 1 circuit, load current does not flow until the commutating capacitor is charged to the value of double the supply voltage so that reliable commutation is assured even under zero impedance load conditions. Another way of stating this is that the blocking diode 68 does not conduct current until the effective capacitor voltage in series with the SCR 62 at least exceeds the supply voltage. To clarify the operation, inductor 65 and half of inductor 64 store energy until the effective capacitor voltage is equal to $E_d$, then this energy is discharged when diode 68 becomes conductive in the loop comprising output transformer winding 66p, diode 68, inductor 65 and half of inductor 64, and SCR 62. To commutate off the SCR 62, if the current has not already dropped to below the holding current, the second SCR 63 is turned on. This places a substantial portion of the voltage on the commutating capacitor 61 across half of the center tapped inductor 64 which by autotransformer action doubles the instantaneous value of the voltage applied in a reverse bias sense to the SCR 62, causing it to start to turn off. On the second half cycle of the inverter operation, the commutating capacitor 61 charges with the opposite polarity, and when the effective capacitor voltage in series with SCR 63 exceeds the supply voltage to thereby render conductive the blocking diode 69, load current flows through the second output transformer primary winding 66p' to be supplied to the load 67. It is seen that the circuit is symmetrical and operates identically on both half cycles. The remaining circuits illustrated in FIGS. 8–11 are variations of the basic FIG. 7 circuit, much as FIGS. 2–5 are modifications of FIG. 1 and will be described both as to structure and operation only to the extent necessary to point out the distinguishing features.

Figure 8:
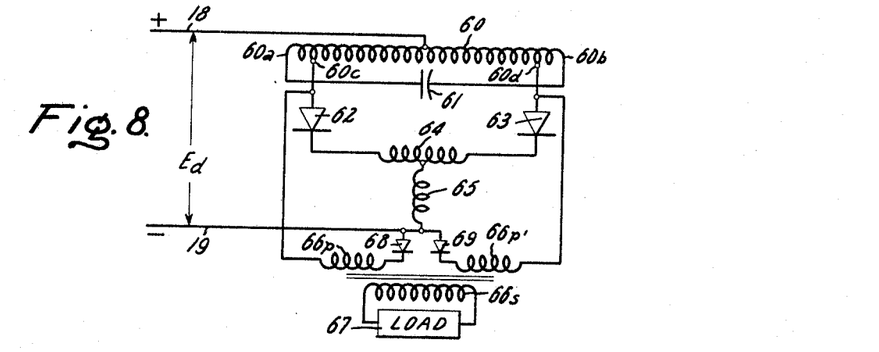
FIG. 8 is a diagram of a modification of the circuit of FIG. 7 illustrating the utility of connecting various portions of the inverter circuit to different taps on the mid-tapped transformer.

The use of the parallel combination of the mid-tapped transformer 60 and the commutating capacitor 61 is particularly advantageous in that the transformer 60 can have taps for stepping up the capacitor voltage and taps for connecting the load. As will be clarified later, the mid-tapped transformer can also have taps for voltage limiting means. The circuit shown in FIG. 8 is identical to the inverter of FIG. 7 with the exception that the power switching SCR's 62 and 63 and the ends of the output transformer primary windings 66p and 66p' are connected to the intermediate tap points 60c and 60d, respectively, which are located symmetrically between the mid-point of the transformer and the two end points 60a and 60b. Since the commutating capacitor 61 is still connected across the ends of the transformer 60, it can be seen that the capacitor voltage is stepped up with respect to the load circuit and the circuits containing the SCR's. Thus for a given load a smaller commutating capacitor can be used in FIG. 8 as compared to FIG. 7. The early charging of the capacitor reduces the rating of the equipment required to a supply given load.

Figure 9:
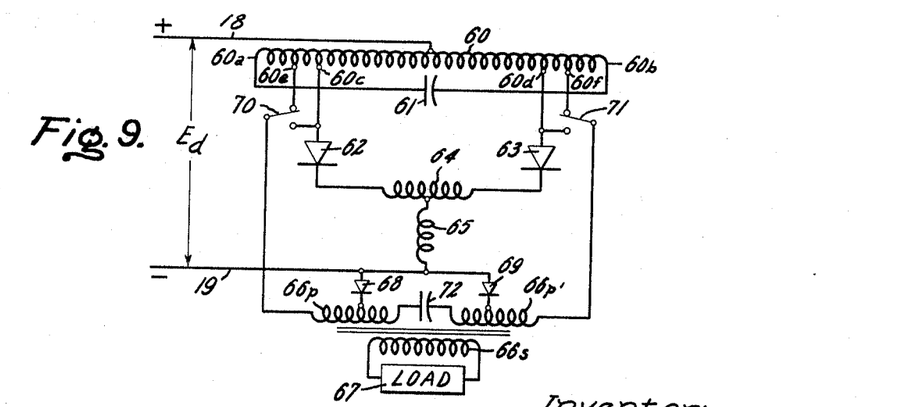

In FIG. 9 the transformer 60 has two additional symmetrical taps 60e and 60f, respectively located farther from the neutral position than the taps 60c and 60d. There is additionally provided a two-position switch 70 for connecting the end of the output transformer primary winding 66p to either of the taps 60e or 60c, and a similar switch 71 on the other side is provided to connect the end of the other output transformer primary winding 66p' to either of the transformer taps 60f or 60d. With the switches 70 and 71 respectively connected to taps 60e and 60f, the load voltage is stepped up somewhat as compared to the situation in which the switches 70 and 71 are connected to the taps 60c and 60d (the same as in FIG. 8). Thus, it is demonstrated that a desired voltage ratio can be chosen for connecting the commutating capacitor, the load circuit, and the SCR power switching circuits with some incremental improvement in output wave shape. Also in FIG. 9, the blocking diodes 68 and 69 are connected to intermediate tap points on the extended output transformer primary windings 66p and 66p', and an additional capacitor 72 is connected between the ends of these extended windings to permit the passage of load current before the blocking diodes 68 and 69 are rendered conductive. This arrangement is essentially the same as shown in FIG. 5. FIG. 9 is thus a compromise circuit, and in the same way as has been taught with regard to the operation of the circuits of FIGS. 3–5, the output wave shape is improved by providing a path for the passage of current through the output transformer windings 66p or 66p' before the respective blocking diodes 68 and 69 are rendered conductive to pass the principal portion of the load current.

Figure 10:
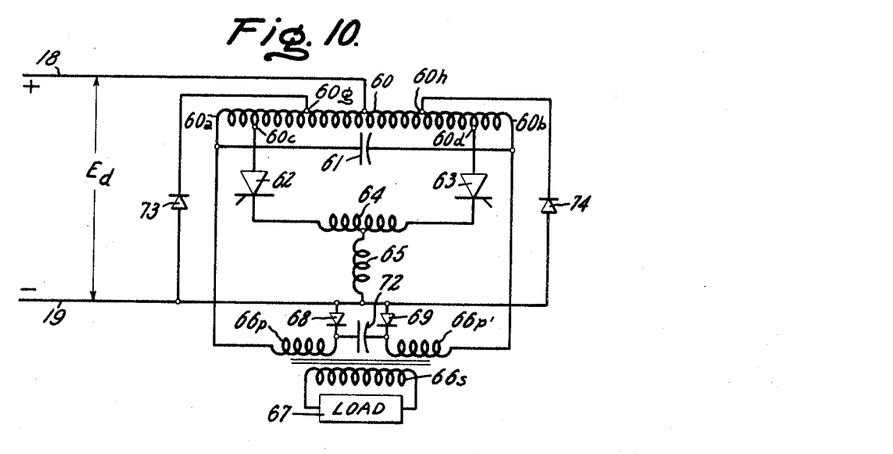

FIG. 10 is another version of a compromise circuit including the capacitor 72. In this circuit the terminals of the additional capacitor 72 and of the blocking diodes 68 and 69 are connected to the ends of the output transformer primary winding 66p and 66p'. Moreover, the load circuit and the commutating capacitor 61 are both connected to the ends 60a and 60b of the transformer 60, whereas the SCR's 62 and 63 are respectively connected to the intermediate tap points 60c and 60d. In this arrangement the capacitor voltage applied to the load circuit is stepped up with respect to the voltage used to commutate the SCR's 62 and 63. An important additional feature in FIG. 10 is that the use of the mid-tapped transformer 60 also implements limiting the voltage on the commutating capacitor and the load circuit. To this end, blocking diodes 73 and 74 are connected between the negative D-C supply terminal 19 and the respective symmetrical taps 60g and 60h on the transformer 60. The taps 60g and 60h for the diodes 73 and 74 are located closer to the mid-point of the transformer than the other taps and are rendered conductive only when the voltage in this portion of the transformer, between the mid-tap and the taps 60g or 60h, exceeds the supply voltage. In this case, some power is returned to the D-C circuit and the voltage on the commutating capacitor 61 and the voltage delivered to the load are both limited.

Figure 11:
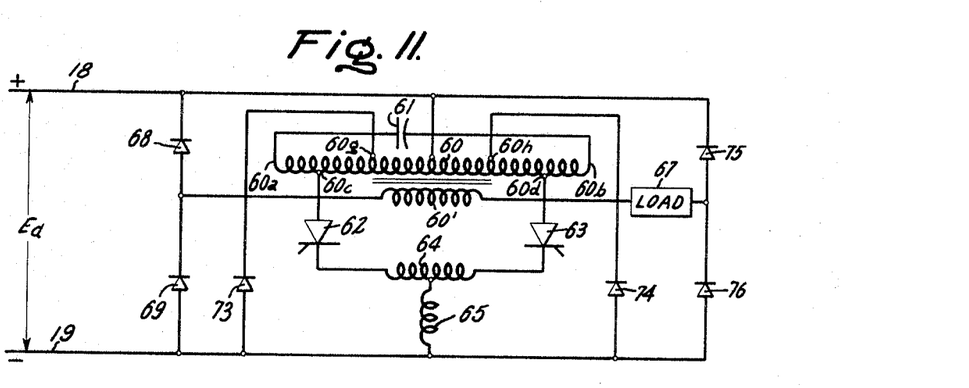
FIG. 11 is a diagram of another modification of the circuit of FIG. 7 showing isolation of the load.

FIG. 11 illustrates another circuit like FIG. 7 in which the voltage limiting diodes 73 and 74 are employed. This circuit differs from the others in the connection of the output load circuit means. A secondary winding 60' which is magnetically coupled to the transformer 60 is connected in series circuit relationship with load 67, and this series connected output load circuit means is connected in a bridge rectifier circuit comprised by the diodes 68 and 69 connected across the D-C supply terminals 18 and 19 and another set of similarly poled diodes 75 and 76 which are also connected across the power supply terminals 18 and 19. During the half cycle of inverter operation in which the SCR 62 is conducting, diodes 68 and 76 do not become conductive to pass current through load 67 until the commutating capacitor 61, depending on the turns ratio in the transformer, has charged to a valve such that the effective capacitor voltage in series with the conducting SCR is any desired portion of the D-C supply voltage. This may be equal to, or above or below the supply voltage. On the other half cycle of inverter operation when the SCR 63 is conducting, passage of current is through the diodes 69 and 75 after these diodes become forward biased by the voltage on the commutating capacitor 61. Increasing the output voltage with respect to the capacitor voltage decreases the equipment rating required to supply a given load. This improvement is obtained with some sacrifice in load range with reliable commutation.

In the family of inverter circuits which have been discussed, there is in particular a novel feature that one of the principal paths for load current requires that the commutating capacitor voltage exceed a certain value with respect to the supply voltage. In certain of the basic inverter circuits, such as FIG. 1 and FIG. 7, there is no load current at all until the commutating capacitor voltage exceeds a predetermined value with respect to the supply voltage, and in other of the compromise circuits such as FIGS. 3 and 9, for example, some load current beings to flow immediately during each half cycle of operation but the principal portion of the load current does not flow until the commutating capacitor voltage exceeds the predetermined value with respect to the supply voltage. In place of the blocking diodes 28, 29 or 68, 69 which block the principal path for load current until they are forward biased, it will be understood that other types of solid state switching means such as other unidirectional conducting devices or gate controlled thyristors can be employed. The same may be said for the load current carrying silicon controlled rectifiers 20, 22 or 62, 63. Any of these solid state devices can be replaced by bidirectional conducting thyristors such as the triac or diac if the gating of these various devices is controlled to achieve the manner of operation which has been described.

While the invention has been particularly shown and described with reference to several preferred embodiments thereof, it will be understood by those skilled in the art that other changes in form and details may be made therein without departing from the spirit and scope of the invention.

What I claim as new and desire to secure by Letters Patent of the United States is:

1. An inverter circuit comprising
    a pair of series connected circuits each comprising the combination of a thyristor device, commutating inductor means, and commutating capacitor means effectively coupled in series circuit relationship,
    said series connected circuits being connected across a pair of power supply terminals and coupled with one another such that the commutating capacitor means of at least one of said series connected circuits is charged when one of the thyristor devices is conducting and is discharged through at least a portion of said commutating inductor means to assure commutation of this same thyristor device when the other thyristor device is rendered conductive by gating means for the thyristors,
    output load circuit means comprising a load effectively coupled to at least one point of said coupled series connected circuits at which the potential changes as the voltage on the commutating capacitor means that is charging changes, and
    solid state switching means connected to another portion of said output load circuit means for blocking the principal path for flow of load current until the commutation capacitor means that is charging has charged to a predetermined potential related to the supply potential in said power supply terminals and renders conductive at least a portion of the solid state switching means so that load current flows through said output load circuit means to the load,
    whereby reliable commutation of the thyristors over a wide range of load impedances is obtained,
    further including additional capacitor means connected to one end of said output load circuit means for providing a path for flow of load current until at least a portion of said solid state switching means is rendered conductive to unblock the principal path for flow of load current therethrough.

2. An inverter circuit comprising
    a pair of series connected circuits each comprising the combination of a thyristor device, commutating inductor means, and commutating capacitor means, effectively coupled in series circuit relationship,
    said series connected circuits being connected across a pair of power supply terminals and coupled with one another such that the commutating capacitor means of at least one of the series connected circuits is charged when one of the thyristor devices is conducting and is discharged through at least a portion of said commutating inductor means to assure commutation of this same thyristor device when the other thyristor device is rendered conductive by gating means for the thyristors,
    load circuit means comprising output transformer means having at least one primary winding which is connected to at least one point on said coupled series connected circuits at which the potential changes as the voltage on the commutating capacitor means that is charging changes, and also having an inductively coupled secondary winding that is in turn connected to a load, said load therefore being inductively coupled to the inverter circuit and having no galvanic connection to the power supply terminals,
    solid state switching means connected to another portion of the primary winding of the output transformer means for blocking the principal path for flow of current from the juncture of said load circuit means with said coupled series connected circuits until the commutating capacitor means that is charging has charged to a predetermined potential related to the supply voltage in the power supply terminals and renders conductive at least a portion of the solid state switching means so that current flows through the output transformer means to the load,
    whereby reliable commutation of the thyristors over a wide range of load impedances is obtained.

3. A circuit as defined in claim 2 wherein the commutating inductor means of said coupled series connected circuits comprises a center-tapped inductor connected between the two thyristor devices across the power supply terminals, and the commutating capacitor means comprises a pair of capacitors connected in series across the power supply terminals,
    the junction of the pair of commutating capacitors being connected to the center tap of the center-tapped inductor and to the one end of the primary winding of the output transformer means, and
    said solid state switching means comprises a pair of similarly poled diodes each connected between the other end of the primary winding and one of the power supply terminals.

4. A circuit as defined in claim 3 wherein the pair of supply terminals are connected to the output terminals of a phase controlled rectifier for controlling the supply voltage to obtain a desired output voltage.

5. A circuit as defined in claim 2 wherein the commutating inductor means of said coupled series connected circuits comprises a center-tapped inductor connected between the two thyristor devices across the power supply terminals, and the commutating capacitor means comprises a pair of capacitors connected in series across the power supply terminals,
    the junction of the pair of commutating capacitors being connected to the center tap of the center-tapped inductor and to the one end of the primary winding of the output transformer means, and
    said solid state switching means comprises a pair of similarly poled diodes each connected between an intermediate point on the primary winding and one of the power supply terminals, and further including
    another pair of similarly poled diodes each connected between the other end of the primary winding and one of the power supply terminals for limiting the excursions of voltage on said pair of commutating capacitors.

6. A circuit as defined in claim 2 wherein the commutating inductor means of said coupled series connected circuits comprises a center-tapped inductor connected between the two thyristor devices across the power supply terminals, and the commutating capacitor means comprises a pair of capacitors connected in series across the power supply terminals,
    the junction of the pair of commutating capacitors being connected to the center tap of the center-tapped inductor and to the one end of the primary winding of the output transformer means, and
    said solid state switching means comprises a pair of similarly poled diodes each connected between an intermediate point on the primary winding and one of the power supply terminals, and further including
    a winding magnetically coupled to said center-tapped inductor which has one end connected directly to one of the power supply terminals and the other end connected through a blocking diode to the other supply terminal to limit the voltage on said center-tapped inductor.

7. An inverter circuit comprising a pair of series connected circuits each comprising the combination of a gate controlled thyristor device, commutating inductor means, and commutating capacitor means, effectively coupled in series circuit relationship, said series connected circuits being connected across a pair of power supply terminals and coupled with one another such that the commutating capacitor means of at least one of the series connected circuits is charged when one of the thyristor devices is conducting and is discharged through at least a portion of said commutating inductor means to assure commutation of this same thyristor device when the other thyristor device is rendered conductive by gating means for the thyristors, output transformer means having a secondary winding connected in series circuit relationship with a load and also having at least one primary winding which is connected to at least one point on said coupled series connected circuits at which the potential changes as the voltage on the commutating capacitor means that is charging changes, and solid state unidirectional conducting means connected to another portion of the primary winding of the output transformer means for blocking the principal path for flow of load current until the commutating capacitor means that is charging has charged to a predetermined potential related to the supply voltage in the power supply terminals and renders conductive at least a portion of the solid state unidirectional conducting means so that current flows through the output transformer means to the load, whereby reliable commutation of the thyristors over a wide range of load impedances is obtained, wherein the commutating inductor means of said coupled series connected circuits comprises a center-tapped inductor connected between the two gate controlled thyristors across the power supply terminals, and the commutating capacitor means comprises a pair of capacitors connected in series across the power supply terminals, one end of the primary winding of the output transformer means being connected to the center tap of the center-tapped inductors while the junction of the pair of commutating capacitors is connected to an intermediate point on the primary winding, and said solid state unidirectional conducting means comprises a pair of similarly poled diodes each connected between the other end of the primary winding and one of the power supply terminals, and further including another pair of capacitors connected across the power supply terminals and at their junction to the other end of the primary winding for improving the output wave shape.

8. An inverter circuit comprising a pair of series connected circuits each comprising the combination of a gate controlled thyristor device, commutating inductor means, and commutating capacitor means, effectively coupled in series circuit relationship, said series connected circuits being connected across a pair of power supply terminals and coupled with one another such that the commutating capacitor means of at least one of the series connected circuits is charged when one of the thyristor devices is conducting and is discharged through at least a portion of said commutating inductor means to assure commutation of this same thyristor device when the other thyristor device is rendered conductive by gating means for the thyristors, output transformer means having a secondary winding connected in series circuit relationship with a load and also having at least one primary winding which is connected to at least one point on said coupled series connected circuits at which the potential changes as the voltage on the commutating capacitor means that is charging changes, and solid state unidirectional conducting means connected to another portion of the primary winding of the output transformer means for blocking the principal path for flow of load current until the commutating capacitor means that is charging has charged to a predetermined potential related to the supply voltage in the power supply terminals and renders conductive at least a portion of the solid state unidirectional conducting means so that current flows through the output transformer means to the load, whereby reliable commutation of the thyristors over a wide range of load impedances is obtained, wherein the commutating capacitor means of said coupled series connected circuits comprises a capacitor connected across the ends of a mid-tapped transformer which has its mid-point coupled to one of the supply terminals, the gate controlled thyristor devices are connected to the mid-tapped transformer symmetrically about the mid-point, and the commutating inductor means comprises a center-tapped first inductor connected to each of the gate controlled thyristor devices and through a second inductor at the center tap to the other power supply terminal, and said output transformer means has two of said primary windings each connected to the mid-tapped transformer symmetrically about the mid-point, and said solid state unidirectional conducting means comprises a pair of similarly poled diodes each connected between another end of one of the primary windings and the other supply terminal.

9. A circuit as defined in claim 8 wherein both the gate controlled thyristor devices and both of the primary windings of the output transformer means are connected to the ends of the mid-tapped transformer.

10. A circuit as defined in claim 8 further including a pair of similarly poled voltage limiting diodes respectively connected to the mid-tapped transformer symmetrically about the mid-point and to one of the supply terminals.

11. A circuit as defined in claim 8 further including an additional capacitor connected between the other ends of the primary windings of the output transformer means for improving the output wave shape.

12. A circuit as defined in claim 8 wherein the primary windings of the output transformer means are respectively connected to the ends of the mid-tapped transformer whereas the gate controlled thyristor devices are connected to intermediate points on the mid-tapped transformer.

References Cited

UNITED STATES PATENTS

| | | | |
|---|---|---|---|
| 3,263,152 | 7/1966 | Walker | 321—45 |
| 3,303,406 | 2/1967 | Bedford | 321—45 XR |
| 3,308,371 | 3/1967 | Studtmann | 321—45 |
| 3,311,809 | 3/1967 | Corey et al. | 321—45 |
| 3,319,147 | 5/1967 | Mapham | 321—45 XR |
| 3,349,315 | 10/1967 | Studtmann | 321—45 |

JOHN F. COUCH, Primary Examiner

W. M. SHOOP, Jr., Assistant Examiner